(12) United States Patent
Finn et al.

(10) Patent No.: US 8,677,254 B2
(45) Date of Patent: Mar. 18, 2014

(54) DISCERNING AND DISPLAYING RELATIONSHIPS BETWEEN AVATARS

(75) Inventors: Peter G. Finn, Brampton (CA); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/179,530

(22) Filed: Jul. 24, 2008

(65) Prior Publication Data

US 2010/0023879 A1    Jan. 28, 2010

(51) Int. Cl.
G06F 3/048 (2013.01)
(52) U.S. Cl.
USPC .......................................................... 715/757
(58) Field of Classification Search
USPC ........... 715/751, 752, 753, 756.757, 758, 759
See application file for complete search history.

(56) References Cited

U.S. PATENT DOCUMENTS

| | | | | |
|---|---|---|---|---|
| 5,604,855 A * | 2/1997 | Crawford | ...................... | 345/473 |
| 6,215,498 B1 * | 4/2001 | Filo et al. | ...................... | 345/419 |
| 6,476,830 B1 * | 11/2002 | Farmer et al. | ................. | 715/769 |
| 7,213,206 B2 * | 5/2007 | Fogg | .............................. | 715/706 |
| 7,342,587 B2 * | 3/2008 | Danzig et al. | .................. | 345/473 |
| 7,386,799 B1 * | 6/2008 | Clanton et al. | ................ | 715/758 |
| 7,401,295 B2 * | 7/2008 | Aldrich et al. | ................. | 715/758 |
| 7,669,123 B2 * | 2/2010 | Zuckerberg et al. | .......... | 715/273 |
| 7,673,003 B2 * | 3/2010 | Little, II | ........................ | 709/206 |
| 7,698,380 B1 * | 4/2010 | Amidon et al. | ............... | 709/218 |
| 7,703,030 B2 * | 4/2010 | Smirin et al. | .................. | 715/765 |
| 7,725,492 B2 * | 5/2010 | Sittig et al. | ..................... | 707/784 |
| 7,801,971 B1 * | 9/2010 | Amidon et al. | ............... | 709/217 |
| 7,802,290 B1 * | 9/2010 | Bansal et al. | ...................... | 726/3 |
| 2003/0177187 A1 | 9/2003 | Levine et al. | | |
| 2004/0179039 A1 * | 9/2004 | Blattner et al. | ............... | 345/758 |
| 2005/0143138 A1 | 6/2005 | Lee et al. | | |
| 2005/0223328 A1 * | 10/2005 | Ashtekar et al. | .............. | 715/706 |
| 2006/0052998 A1 | 3/2006 | Michelman | | |
| 2006/0053389 A1 | 3/2006 | Michelman | | |
| 2006/0148528 A1 * | 7/2006 | Jung et al. | ...................... | 455/566 |
| 2006/0248573 A1 * | 11/2006 | Pannu et al. | ...................... | 726/1 |
| 2007/0162862 A1 * | 7/2007 | Ogasawara et al. | ........... | 715/751 |
| 2008/0020361 A1 * | 1/2008 | Kron et al. | ..................... | 434/262 |
| 2008/0030496 A1 * | 2/2008 | Lee et al. | ...................... | 345/418 |
| 2008/0086696 A1 | 4/2008 | Sri Prakash et al. | | |
| 2008/0120558 A1 * | 5/2008 | Nathan et al. | .................. | 715/764 |
| 2008/0201638 A1 * | 8/2008 | Nair | .............................. | 715/706 |
| 2008/0207331 A1 * | 8/2008 | Beale | .............................. | 463/42 |
| 2009/0037822 A1 * | 2/2009 | Kandekar et al. | ............. | 715/733 |
| 2009/0157813 A1 * | 6/2009 | Jung et al. | ...................... | 709/204 |
| 2009/0163278 A1 * | 6/2009 | Kawanaka et al. | ............. | 463/40 |
| 2009/0172539 A1 * | 7/2009 | Bates et al. | ..................... | 715/706 |

* cited by examiner

*Primary Examiner* — Enrique Iturralde
(74) *Attorney, Agent, or Firm* — Lisa Ulrich; Hoffman Warnick LLC

(57) ABSTRACT

The invention relates generally to virtual universe environments and, more particularly, to discerning and displaying information regarding relationships between two or more avatars in a virtual universe environment. In one embodiment, the invention includes determining whether a first avatar and a second avatar have at least one relationship with one or more common avatars in response to the first avatar initiating an interaction with the second avatar, and in the case that the first and second avatars have at least one relationship with at least one common avatar, displaying information regarding the relationship with the common avatar to at least one of the first and second avatar.

17 Claims, 6 Drawing Sheets

DISCERNING AND DISPLAYING RELATIONSHIPS BETWEEN AVATARS

FIELD OF THE INVENTION

The invention relates generally to virtual universe environments and, more particularly, to discerning and displaying information regarding relationships between two or more avatars in a virtual universe environment.

BACKGROUND OF THE INVENTION

Avatars in virtual worlds can have a wide range of business and social experiences. Such experiences are becoming more important as business and social transactions are becoming common in virtual worlds such as Second Life®. (Second Life is a trademark of Linden Research in the United States, other countries, or both.) It is important that such virtual environments replicate, as closely as possible, the experiences that individuals have come to expect and appreciate in equivalent physical environments.

In the physical world, social networks are generally understood and propagated verbally, through specific memberships, and through other similar means. In virtual environments, though, it is often difficult to quickly discover varying degrees of social networks or information regarding the members of such networks.

SUMMARY OF THE INVENTION

The invention provides a method, system, and program product for discerning and displaying information regarding a relationship between at least two avatars in a virtual universe environment.

A first aspect of the invention provides a method of discerning and displaying information regarding a relationship between at least two avatars in a virtual universe environment, the method comprising: determining whether a first avatar and a second avatar have at least one relationship with one or more common avatars in response to the first avatar initiating an interaction with the second avatar; and in the case that the first and second avatars have at least one relationship with at least one common avatar, displaying information regarding the relationship with the common avatar to at least one of the first and second avatar.

A second aspect of the invention provides a system for discerning and displaying information regarding a relationship between at least two avatars in a virtual universe environment, the method comprising: a system for determining whether a first avatar and a second avatar have relationships with one or more common avatars; and a system for displaying information regarding a relationship with a common avatar to at least one of the first and second avatar.

A third aspect of the invention provides a program product stored on a computer-readable medium, which when executed, discerns and displays information regarding a relationship between at least two avatars in a virtual universe environment, the program product comprising: program code for determining whether a first avatar and a second avatar have relationships with one or more common avatars; and program code for displaying information regarding a relationship with the common avatar to at least one of the first and second avatar.

A fourth aspect of the invention provides a method for deploying an application for discerning and displaying information regarding a relationship between at least two avatars in a virtual universe environment, comprising: providing a computer infrastructure being operable to: determine whether a first avatar and a second avatar have relationships with one or more common avatars; and display information regarding a relationship with a common avatar to at least one of the first and second avatar.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
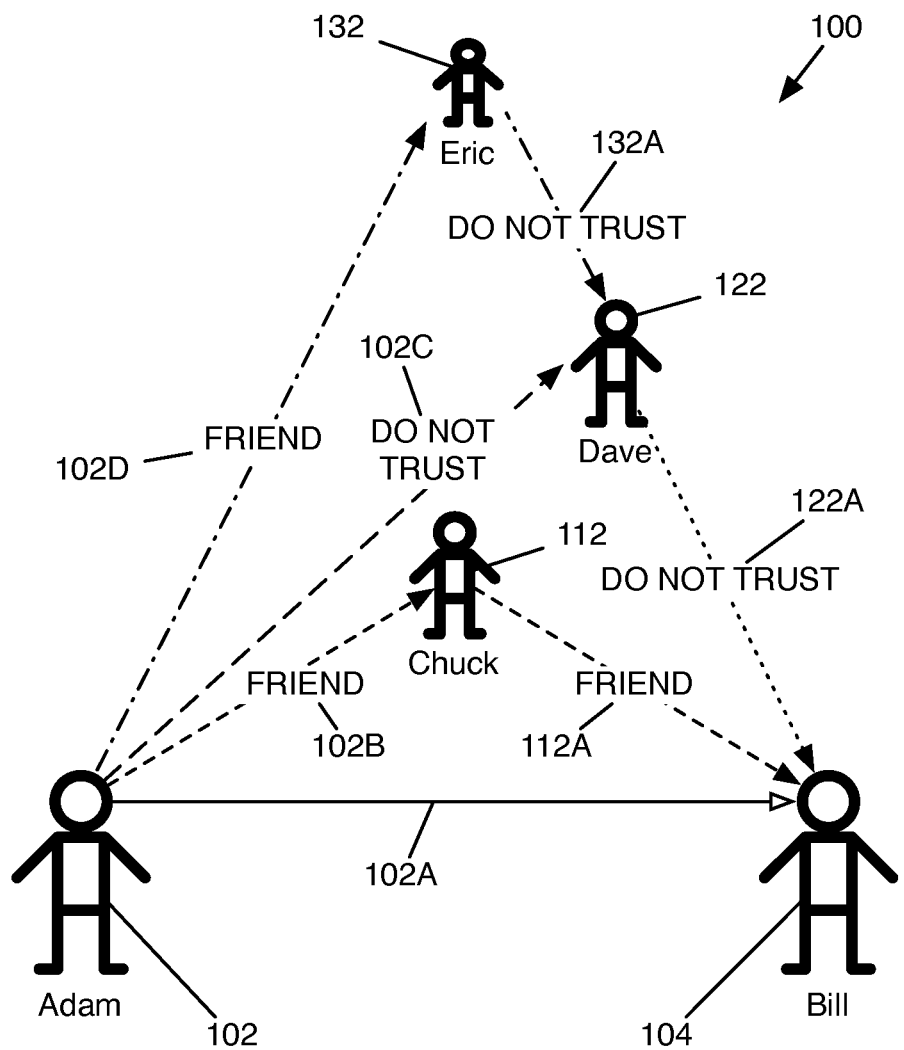
FIGS. 1 and 2 show illustrative relationships between avatars in a virtual universe.

Turning now to the drawings, FIG. 1 shows a relationship display 100 as might be provided to a first avatar participating in an interaction with a second avatar with whom the first avatar has no prior experience. Here, the first avatar Adam 102 is interacting 102A with a second avatar Bill 104. Adam 102 may wish to know whether any other avatars with whom Adam is familiar have existing relationships or have had prior interactions with Bill 104. Relationship display 100, therefore, provides information regarding relationships between avatars known to both Adam 102 and Bill 104, whether such relationships are direct or indirect, and, if indirect, the degree of removal of the relationship.

For example, Chuck 112 and Dave 122 are shown in first degree relationships to both Adam 102 and Bill 104. That is, Adam 102 has characterized Chuck 112 as a FRIEND 102B, who, in turn, has characterized Bill 104 as a FRIEND 112A. Thus, Chuck 112 has first degree relationships with both Adam 102 and Bill 104. Given that Adam 102 considers Chuck 112 a friend, Adam may give great weight to the fact that Chuck 112 has characterized Bill 104 as a friend in deciding how to approach his interaction 102A with Bill 104. Similarly, since Adam 102 has characterized Dave 122 as someone he does not trust ("DO NOT TRUST" 102C), he may not give much or any weight to the fact that Dave 122 has characterized Bill 104 as someone he does not trust ("DO NOT TRUST" 122A).

Relationship display 100 may include any number of degrees of relationship, depending on how useful a particular user believes they may be. For example, in relationship display 100, Eric 132 is shown in a second degree relationship with Bill 104. Here, Eric 132, whom Adam has characterized as a FRIEND 102D has indicated that he does not trust ("DO NOT TRUST" 132A) Dave 122, who, in turn, has indicated that he does not trust Bill 104. In this case, the inclusion of the second degree relationship involving Eric 132 may not provide much additional information of value to Adam 102, given that he has a first degree relationship with Dave 122, whom he has also indicated he does not trust. However, if Adam 102 did not have a relationship with Dave 122, the inclusion of the second degree relationship involving Eric 132 may be very helpful in resolving the conflicting relationships between Chuck 112 and Bill 104 (FRIEND 112A) and Dave 122 and Bill 104 (DO NOT TRUST 122A).

In some embodiments, the decision as to how many relationships or what degree of relationships to include may be made on a sliding scale. For example, if it is determined that there are five first degree relationships between Adam 102 and Bill 104, it may not be necessary to provide any second degree relationships in relationship display 100. If only four first degree relationships exist, it may be beneficial to include, for example, two second degree relationships as well. Similarly, the number of relationships to include in relationship display 100 may be based on the strength of the relationships. For example, if Bill 104 were characterized as completely untrustworthy by an avatar that Adam 102 considers completely trustworthy, it may be unnecessary to include any second degree relationships, or even any additional first degree relationships, in relationship display 100.

Relationship display 100 may be displayed to one or more avatars (e.g., to Adam 102 and/or Bill 104). It is quite possible, however, that a particular relationship display 100 may be applicable to only one avatar. For example, it may be the case that some avatars with whom Bill 104 has relationships have characterized their relationships with Adam 102 but those relationships have not been similarly characterized by Adam 102. Thus, the inclusion of such relationships would only be of value to Bill 104.

Figure 2:
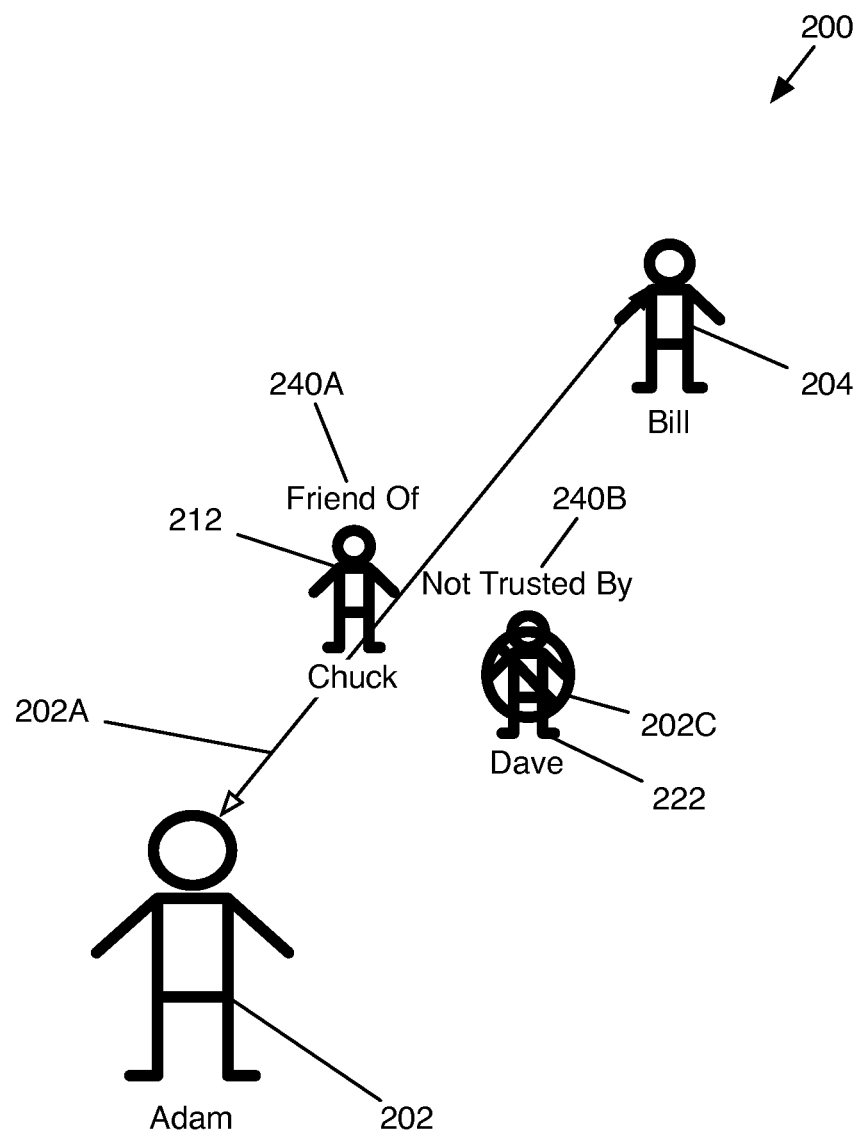

Relationships may be shown in any number of ways, depending on what format or style is most beneficial to a particular user. For example, FIG. 2 shows a relationship display 200, wherein additional avatars 212, 222 are shown between Adam 202 and Bill 204 and categorized 240A, 240B according to relationship. Here, Chuck 212 is shown within the "Friend Of" category, meaning Bill 204 has been characterized by Chuck 212 as his friend. Similarly, Dave 222 is shown within the "Not Trusted By" category, meaning Bill 204 is not trusted by Dave 222. Here, an indicator 202C has been included with respect to Dave 222 to show that Adam's 202 own characterization of Dave 222 indicates that Dave's 222 characterization of Bill 204 and/or their relationship should not be trusted (see FIG. 1, wherein Adam 102 has indicated that he does not trust Dave 122).

The relationship displays shown in FIGS. 1 and 2 are merely illustrative of the ways in which relationships among and between avatars may be displayed. For example, a particular user may prefer simple text displays of information or that the characterizations of relationships be provided as icons or in numeric form. Any and all display of relationship information is within the scope of the invention.

Figure 3:
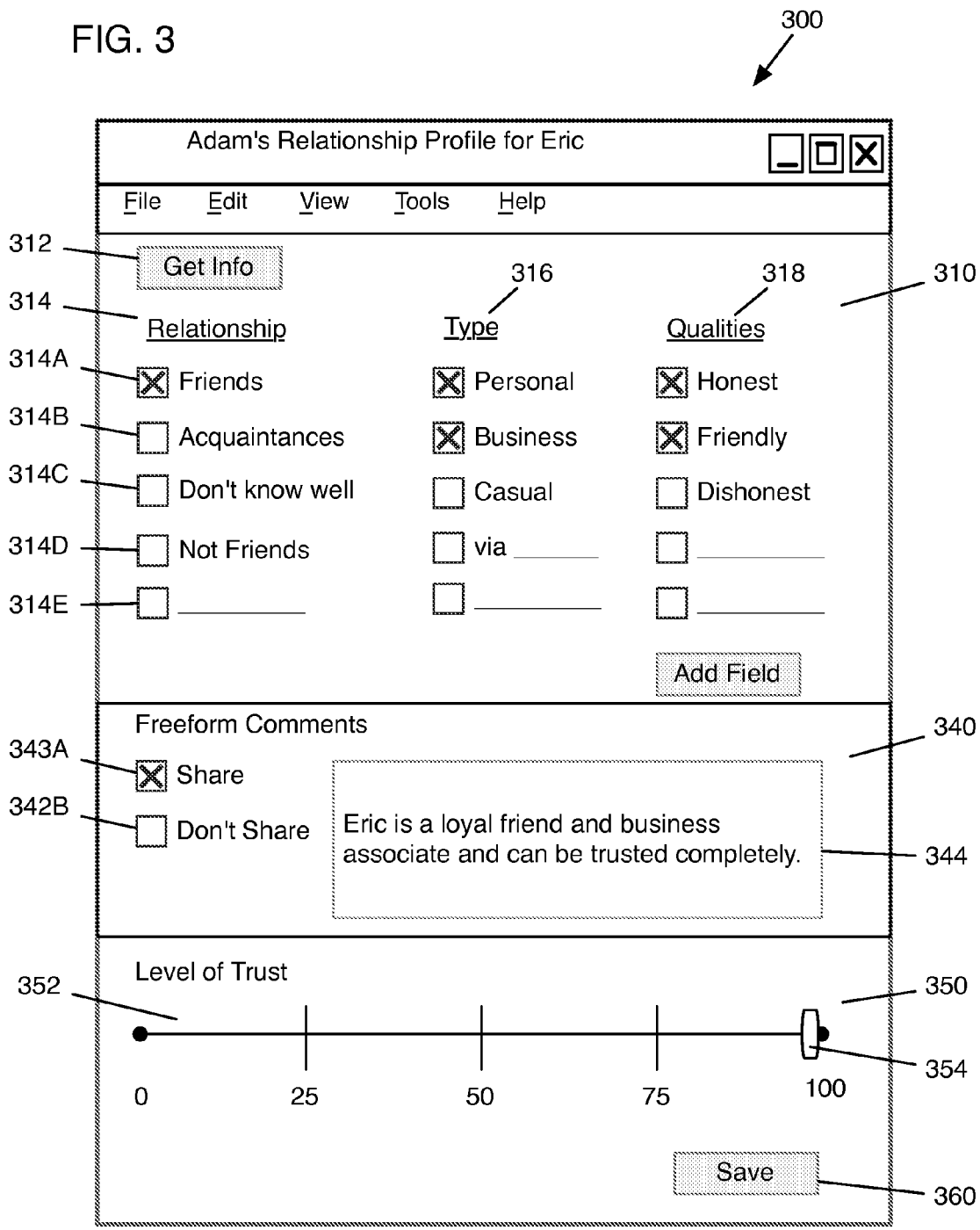
FIG. 3 shows an illustrative window for characterizing a relationship between avatars.

FIG. 3 shows a relationship characterization window 300 in which a user may characterize his/her relationship with another avatar. Window 300 is shown having a categorization portion 310 in which a user may select relevant pre-defined 314A-D or user-defined 314E characterizations within one or more categories 314, 316, 318, a freeform text portion 340 in which a user may make freeform comments within a text window 344 and, optionally, choose to share 343A or not share 342B such freeform comments with others, and a trust meter portion 350 in which a user may indicate his/her relative level of trust of the avatar by moving a slider 354 along a trust scale 352. These are merely illustrative of the kinds of information and the ways in which they may be displayed within relationship characterization window 300. For example, in a business environment, it may be desirable to have characterizations or evaluations of particular abilities or skills of an avatar. Once completed, a user may choose to save 360 the entries for later use by him/herself or for sharing with others.

In a preferred embodiment, data from a plurality of relationship characterization windows 300 are stored in a relational database that may be queried by a large number of avatars to both find and report relationships among and between avatars in a virtual universe. In such an embodiment, it may be possible to retrieve relevant data from the database using a "Get Info" button 312 or similar command. For example, retrieving such data may enable an initial level of trust to be established for an avatar based on the trust levels set by other avatars, preferably avatars with whom the querying avatar has relationships and whose judgment the querying avatar would consider helpful.

Figure 4:
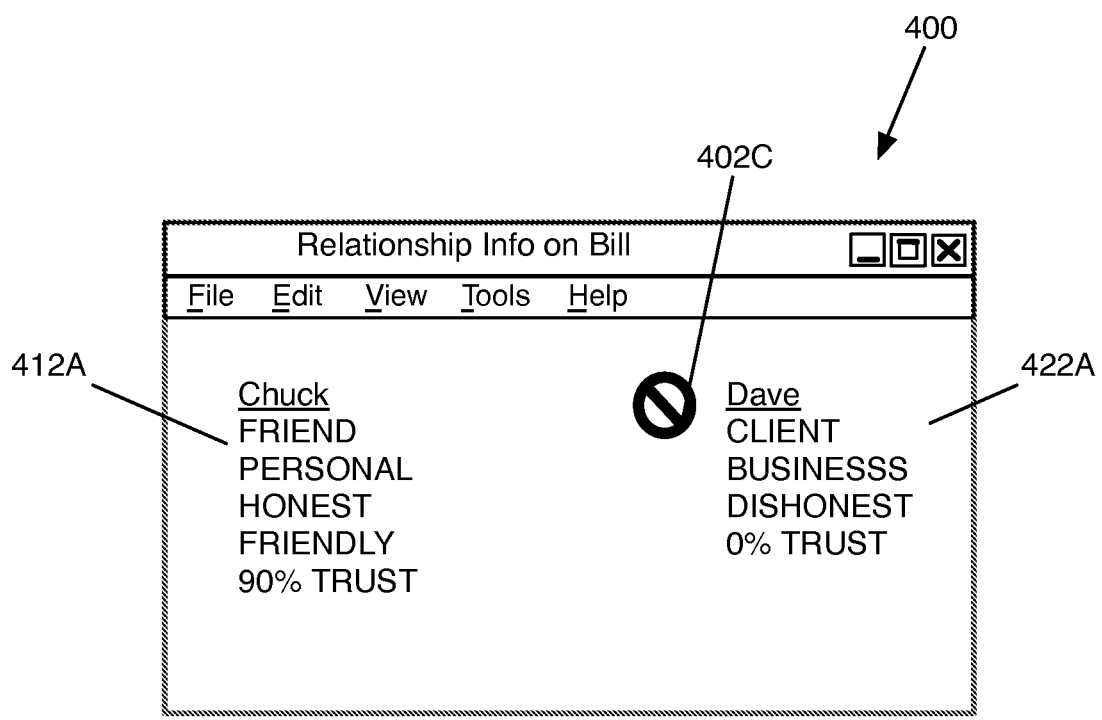
FIG. 4 shows a result of an illustrative query of relationships of an avatar.

FIG. 4 shows a relationship information window 400 that may be provided following a database query such as that described above. Here, the relationship characterizations 412A, 422A of avatars with whom Adam 102 (FIG. 1) has an existing first degree relationship are shown. Again, as in FIG. 2, an indicator 402C has been included with respect to Dave's characterization 422A to show that Adam's 102 own characterization of Dave 122 (FIG. 1) indicates that Dave's 122 characterization of Bill 104 (FIG. 1) and/or their relationship should not be trusted. While shown in FIG. 4 with respect to individual avatars, the results of a database query may alternatively be reported in aggregate or summary form, or a combination of these or other forms. In addition, while shown in FIG. 4 as a query based on any avatar having a first degree relationship with Bill 104 with whom Adam 102 also has a relationship, a query may include any number or relevant variables. For example, the query may return data only avatars with a first degree relationship to Adam 102 and for whom Adam 102 has attributed a high level of trust. Alternatively, the query may return data from avatars having a second, third, fourth, or higher degree relationship with Adam 102 or Bill 104, or data only from avatars that have characterized their relationships with Bill 104 unfavorably.

In some embodiments, an avatar may have the ability to opt out of participating in such characterizing and querying of avatar-to-avatar relationships. For example, an avatar may be permitted to prohibit another avatar from submitting data to a database regarding their relationship. In such a case, the avatar opting out of participation may similarly be prohibited from making queries of a database to retrieve data related to other avatar-to-avatar relationships.

Figure 5:
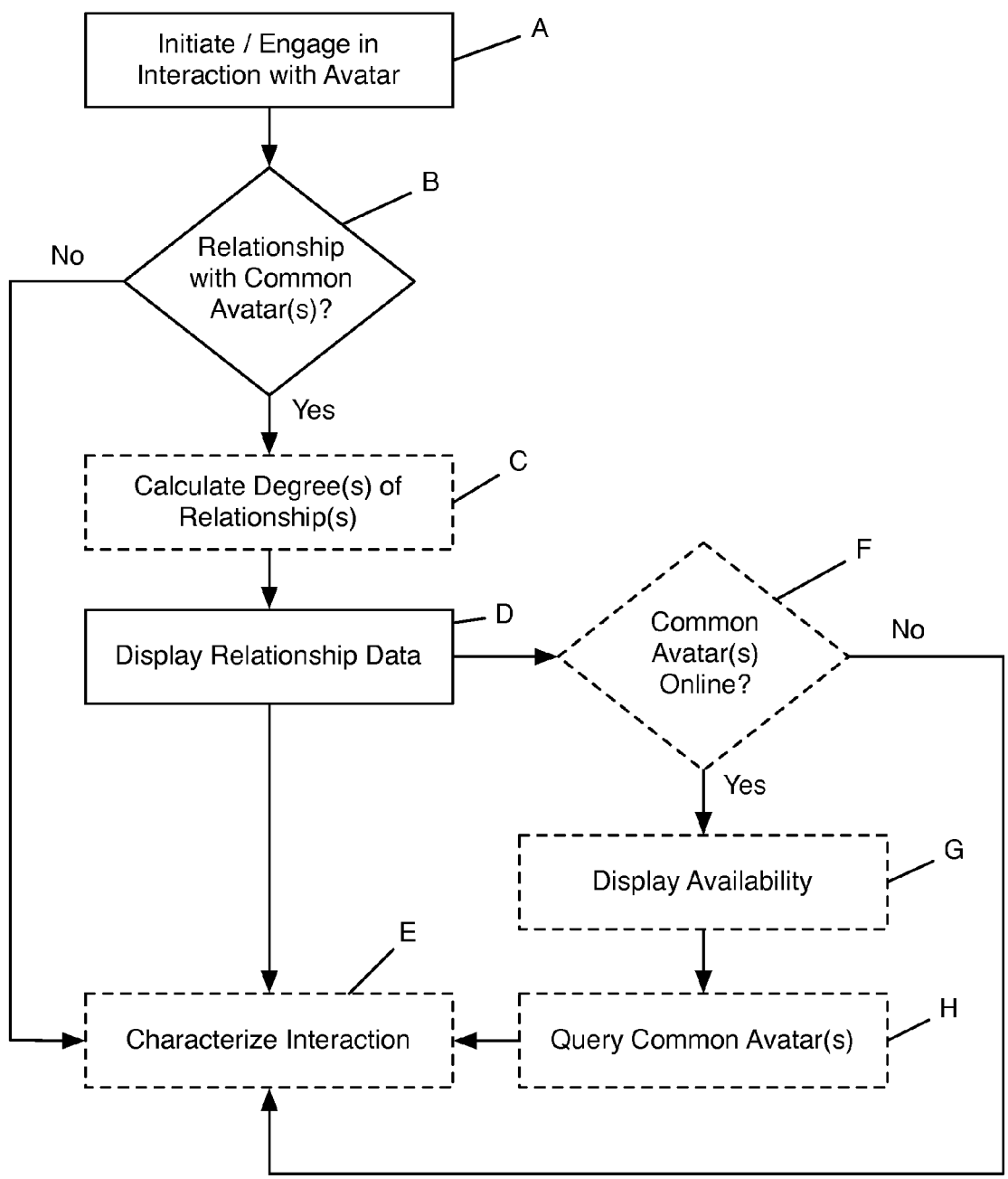
FIG. 5 shows a flow diagram of an illustrative method according to the invention.

FIG. 5 shows a flow diagram of an illustrative method according to the invention. At A, a first avatar initiates or engages in an interaction with a second avatar. At B, it is determined whether the first and second avatars have a relationship with one or more common avatars. If not (i.e., No at B), the first and/or second avatar may optionally choose to characterize their interaction at E. As noted above, such characterizations are preferably included in a relational database for future querying and reporting.

If the first and second avatars have relationships with one or more common avatars (i.e., Yes at B), the degree of the relationship(s) may optionally be calculated at C. At D, the relationship data are displayed to one or both of the first and second avatars. If relationship degree(s) were calculated at C, these may be included in the display at D.

At F, it may optionally be determined whether any of the common avatars are available online. If not (i.e., No at F), the first and/or second avatar may optionally choose to characterize their interaction at E. If a common avatar is available online (i.e., Yes at F), the avatar's availability may be displayed to one or both of the first and second avatar at G. At H, one or both of the first and second avatar may query the common avatar(s) to inquire about the other. Finally, the first and/or second avatar may optionally choose to characterize their interaction at E.

Figure 6:
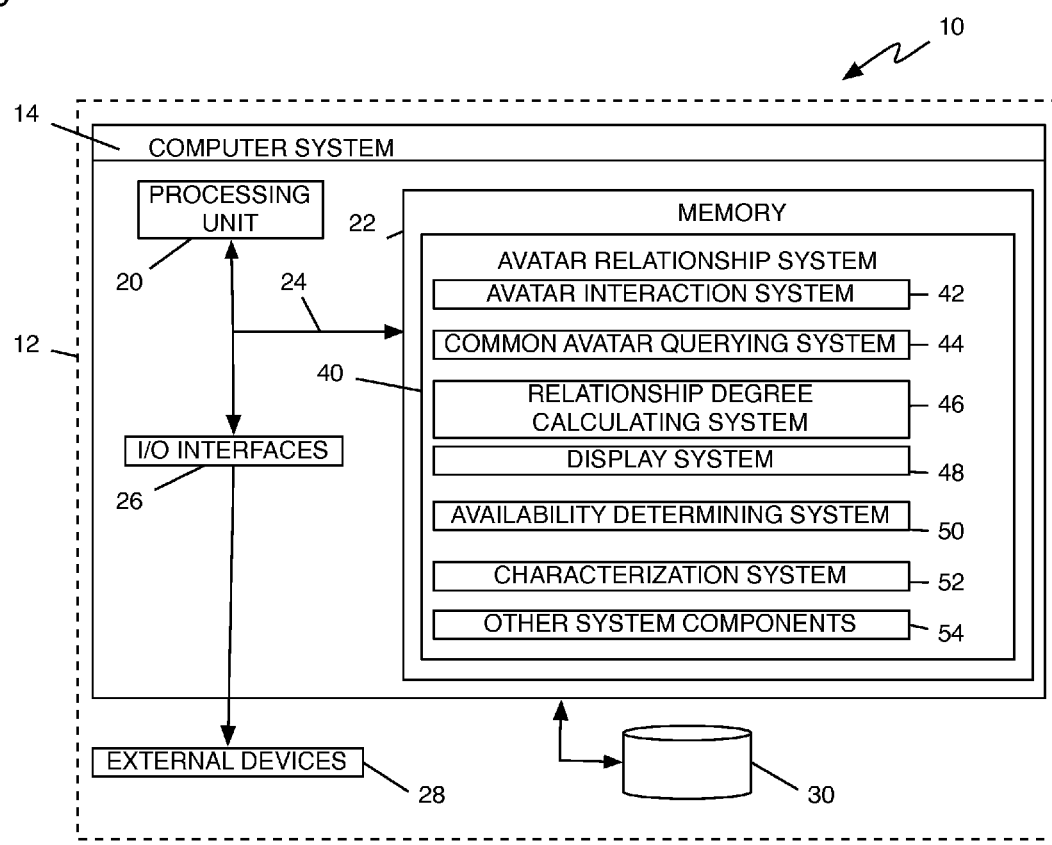
FIG. 6 shows a block diagram of an illustrative system according to the invention.

FIG. 6 shows an illustrative system 10 for discerning and displaying relationships between and among avatars. To this extent, system 10 includes a computer infrastructure 12 that can perform the various process steps described herein for discerning and displaying relationships between and among avatars. In particular, computer infrastructure 12 is shown including a computer system 14 that comprises an avatar relationship system 40, which enables computer system 14 to discerning and displaying relationships between and among avatars by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as avatar relationship system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and avatar relationship system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the avatar relationship system 40 enables the computer system 14 to discerning and displaying relationships between and among avatars. To this extent, the avatar relationship system 40 is shown including an avatar interaction system 42, a common avatar querying system 44, a relationship degree calculating system 46, a display system 48, an availability determining system 50, and a characterization system 52. Operation of each of these systems is discussed above. The avatar relationship system 40 may further include other system components 54 to provide additional or improved functionality to the avatar relationship system 40. It is understood that some of the various systems shown in FIG. 6 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for discerning and displaying relationships between and among avatars in a virtual world, it is understood that the invention further provides various alternative embodiments. For example, in one embodiment, the invention provides a computer-readable medium that includes computer program code to enable a computer infrastructure to discern and display relationships between and among avatars. To this extent, the computer-readable medium includes program code, such as avatar relationship system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to discern and display relationships between and among avatars in a virtual world, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for discerning and displaying relationships between and among avatars. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of discerning and displaying information regarding a relationship between at least two avatars in a virtual universe environment, the method comprising:
   determining whether a first avatar and a second avatar have at least one relationship with one or more common avatars in response to an indication of the first avatar initiating an interaction within the virtual universe with the second avatar, wherein the at least one relationship comprises: a common acquaintance comprising at least a third avatar distinct from the first avatar and the second avatar, and a level of trust corresponding to the third avatar based on at least one prior interaction within the virtual world between the third avatar and one of the first or the second avatar, wherein the level of trust is set by the one of the first or the second avatar;
   in the case that the first and second avatars have at least one relationship with at least the third avatar, displaying, within the virtual universe, information regarding the at least one relationship with the third avatar to at least one of the first and second avatar, the displaying including displaying, within the virtual universe, an indication of a third avatar and a level of trust corresponding to the third avatar, wherein the indication of a level of trust includes an indicia affirming that the third avatar is not trusted or an indicia confirming that the third avatar is trusted; and
   determining if the third avatar is currently online in the virtual universe.

2. The method of claim 1, wherein determining includes calculating a degree to which a relationship is shared between the first and second avatar.

3. The method of claim 2, further comprising:
   displaying the relationship degree to at least one of the first and second avatar.

4. The method of claim 1, wherein displaying includes displaying at least one of the following: a name of the third avatar in the shared relationship, a representation of the third avatar in the shared relationship, and a description of the shared relationship.

5. The method of claim 4, wherein the description of the shared relationship includes a rating by the third avatar of a relationship between the common avatar and at least one of the first and second avatar.

6. The method of claim 5, wherein the rating includes a component capable of being displayed.

7. The method of claim 1, further comprising:
   informing at least one of the first and second avatar of the online availability of the third avatar.

8. The method of claim 7, further comprising:
   at least one of the first and second avatar querying the third avatar regarding the relationship between the third avatar and at least one of the first and second avatar.

9. The method of claim 1, further comprising:
   permitting at least one of the first and second avatar to characterize their interaction.

10. A system for discerning and displaying information regarding a relationship between at least two avatars in a virtual universe environment, the system comprising:
    at least one computer device for performing a method including:
    determining whether a first avatar and a second avatar have at least one relationship with one or more common avatars, wherein the at least one relationship comprises: a common acquaintance comprising at least a third avatar distinct from the first avatar and the second avatar, and a level of trust corresponding to the third avatar based on at least one prior interaction within the virtual world between the third avatar and one of the first or the second avatar, wherein the level of trust is set by the one of the first or the second avatar;
    displaying, within the virtual universe, information regarding the at least one relationship with at least the third avatar to at least one of the first and second avatar, the displaying including displaying, within the virtual universe, an indication of a third avatar and a level of trust corresponding to the third avatar, wherein the indication of a level of trust includes an indicia affirming that the third avatar is not trusted or an indicia confirming that the third avatar is trusted; and
    determining if the third avatar is currently online in the virtual universe.

11. The system of claim 10, the method further comprising:
    calculating a degree to which a relationship is shared between the first and second avatar.

12. The system of claim 11, the method further comprising:
    querying the third avatar.

13. The system of claim 10, the method further comprising:
    characterizing an interaction between the first and second avatar.

14. A program product stored on a non-transitory computer-readable medium, which when executed, discerns and displays information regarding a relationship between at least two avatars in a virtual universe environment, by performing a method comprising:
    determining whether a first avatar and a second avatar have at least one relationship with one or more common avatars, wherein the at least one relationship comprises: a common acquaintance comprising at least a third avatar distinct from the first avatar and the second avatar, and a level of trust corresponding to the third avatar based on at least one prior interaction within the virtual world between the third avatar and one of the first or the second avatar, wherein the level of trust is set by the one of the first or the second avatar;
    displaying, within the virtual universe, information regarding the at least one relationship with at least the third avatar to at least one of the first and second avatar, the displaying including displaying, within the virtual universe, an indication of a third avatar and a level of trust corresponding to the third avatar, wherein the indication of a level of trust includes an indicia affirming that the third avatar is not trusted or an indicia confirming that the third avatar is trusted; and determining if the third avatar is currently online in the virtual universe.

15. The program product of claim 14, the method further comprising:

calculating a degree to which a relationship is shared between the first and second avatar.

16. The program product of claim 14, the method further comprising:

characterizing an interaction between the first and second avatar.

17. A method for deploying an application for discerning and displaying information regarding a relationship between at least two avatars in a virtual universe environment, comprising:

providing a computer infrastructure being operable to:

determine whether a first avatar and a second avatar have at least one relationship with one or more common avatars, wherein the at least one relationship comprises: a common acquaintance comprising at least a third avatar distinct from the first avatar and the second avatar, and a level of trust corresponding to the third avatar based on at least one prior interaction within the virtual world between the third avatar and one of the first or the second avatar, wherein the level of trust is set by the one of the first or the second avatar; and display, within the virtual universe, information regarding the at least one relationship with at least third avatar to at least one of the first and second avatar, the displaying including displaying, within the virtual universe, an indication of a third avatar and a level of trust corresponding to the third avatar, wherein the indication of a level of trust includes an indicia affirming that the third avatar is not trusted or an indicia confirming that the third avatar is trusted; and determining if the third avatar is currently online in the virtual universe.

\* \* \* \* \*